United States Patent
Wallach

(10) Patent No.: US 11,941,402 B2
(45) Date of Patent: *Mar. 26, 2024

(54) REGISTERS IN VECTOR PROCESSORS TO STORE ADDRESSES FOR ACCESSING VECTORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,922

(22) Filed: May 5, 2022

(65) Prior Publication Data

US 2022/0261253 A1 Aug. 18, 2022

Related U.S. Application Data

(63) Continuation of application No. 16/417,500, filed on May 20, 2019, now Pat. No. 11,340,904.

(51) Int. Cl.
*G06F 9/38* (2018.01)
*G06F 9/30* (2018.01)
(Continued)

(52) U.S. Cl.
CPC ........ *G06F 9/3824* (2013.01); *G06F 9/30036* (2013.01); *G06F 9/30043* (2013.01);
(Continued)

(58) Field of Classification Search
CPC ............. G06F 15/8076; G06F 15/8061; G06F 15/8053; G06F 9/30036; G06F 9/30043;
(Continued)

(56) References Cited

U.S. PATENT DOCUMENTS 5,226,171 A 7/1993 Hall et al.
5,511,210 A 4/1996 Nishikawa et al.
(Continued)

FOREIGN PATENT DOCUMENTS

WO 2019011653 A1 1/2019

OTHER PUBLICATIONS

Merriam-Webster, "compress", <https://www.merriam-webster.com/dictionary/compress> (Year: 2023).*

(Continued)

*Primary Examiner* — Jyoti Mehta
*Assistant Examiner* — Kasim Alli
(74) *Attorney, Agent, or Firm* — Greenberg Traurig

(57) ABSTRACT

Disclosed herein are vector index registers in vector processors that each store multiple addresses for accessing multiple positions in vectors. It is known to use scalar index registers in vector processors to access multiple positions of vectors by changing the scalar index registers in vector operations. By using a vector indexing register for indexing positions of one or more operand vectors, the scalar index register can be replaced and at least the continual changing of the scalar index register can be avoided.

18 Claims, 10 Drawing Sheets

(51) Int. Cl.
*G06F 9/345* (2018.01)
*G06F 9/355* (2018.01)
*G06F 15/80* (2006.01)

(52) U.S. Cl.
CPC .............. *G06F 9/345* (2013.01); *G06F 9/355* (2013.01); *G06F 15/8053* (2013.01)

(58) Field of Classification Search
CPC .... G06F 9/30032; G06F 9/3824; G06F 9/345; G06F 9/355; G06F 9/30038
See application file for complete search history.

(56) References Cited

U.S. PATENT DOCUMENTS

| | | | |
|---|---|---|---|
| 6,269,435 | B1 | 7/2001 | Dally et al. |
| 6,334,176 | B1 | 12/2001 | Scales, III et al. |
| 7,793,084 | B1 | 9/2010 | Mimar |
| 7,962,718 | B2 * | 6/2011 | Moyer ................ G06F 9/30032 712/220 |
| 11,340,904 | B2 | 5/2022 | Wallach |
| 2002/0087846 | A1 | 7/2002 | Nickolls et al. |
| 2004/0006681 | A1 | 1/2004 | Moreno et al. |
| 2004/0153623 | A1 | 8/2004 | Buchty et al. |
| 2004/0250044 | A1 | 12/2004 | Isomura |
| 2006/0136700 | A1 | 6/2006 | Barlow et al. |
| 2006/0184765 | A1 | 8/2006 | Krueger |
| 2007/0033381 | A1 | 2/2007 | Wilson |
| 2008/0016320 | A1 | 1/2008 | Menon et al. |
| 2008/0046683 | A1 | 2/2008 | Codrescu et al. |
| 2010/0274988 | A1 | 10/2010 | Mimar |
| 2010/0312988 | A1 | 12/2010 | Bjoerklund et al. |
| 2012/0060020 | A1 | 3/2012 | Gonion et al. |
| 2012/0166761 | A1 | 6/2012 | Hughes et al. |
| 2013/0166516 | A1 | 6/2013 | Reid |
| 2013/0185538 | A1 | 7/2013 | Hung et al. |
| 2013/0212354 | A1 | 8/2013 | Mimar |
| 2013/0246759 | A1 | 9/2013 | Bradbury et al. |
| 2013/0262833 | A1 | 10/2013 | Gonion |
| 2014/0013075 | A1 | 1/2014 | Hagog et al. |
| 2014/0019715 | A1 | 1/2014 | Ould-Ahmed-Vall et al. |
| 2014/0189293 | A1 | 7/2014 | Gopal et al. |
| 2014/0189323 | A1 | 7/2014 | Bharadwaj et al. |
| 2014/0281425 | A1 | 9/2014 | Valentine et al. |
| 2015/0046671 | A1 | 2/2015 | Ould-Ahmed-Vall |
| 2016/0011873 | A1 | 1/2016 | Plotnikov |
| 2016/0026607 | A1 | 1/2016 | Codrescu et al. |
| 2016/0092218 | A1 | 3/2016 | Gonion |
| 2016/0092398 | A1 | 3/2016 | Gonion et al. |
| 2016/0124651 | A1 | 5/2016 | Sankaranarayanan et al. |
| 2016/0179520 | A1 | 6/2016 | Jha et al. |
| 2016/0179526 | A1 | 6/2016 | Jha et al. |
| 2016/0179537 | A1 | 6/2016 | Kunzman et al. |
| 2017/0177356 | A1 | 6/2017 | Ould-Ahmed-vall et al. |
| 2017/0177359 | A1 | 6/2017 | Ould-Ahmed-vall |
| 2017/0177363 | A1 | 6/2017 | Yount et al. |
| 2017/0185412 | A1 | 6/2017 | Mishra et al. |
| 2017/0308141 | A1 | 10/2017 | Anderson et al. |
| 2019/0004797 | A1 | 1/2019 | Zbiciak et al. |
| 2019/0004814 | A1 | 1/2019 | Chen et al. |
| 2019/0042253 | A1 | 2/2019 | Eyole et al. |
| 2019/0196825 | A1 | 6/2019 | Grocutt et al. |
| 2019/0205137 | A1 | 7/2019 | Meadows et al. |
| 2020/0210199 | A1 | 7/2020 | Ould-Ahmed-Vall |
| 2020/0225953 | A1 | 7/2020 | Magklis et al. |
| 2020/0371792 | A1 | 11/2020 | Wallach |
| 2020/0371801 | A1 | 11/2020 | Wallach |
| 2020/0371802 | A1 | 11/2020 | Wallach |
| 2020/0371886 | A1 | 11/2020 | Wallach |
| 2021/0216318 | A1 | 7/2021 | Langhammer et al. |
| 2021/0216319 | A1 | 7/2021 | Zbiciak et al. |
| 2021/0294605 | A1 | 9/2021 | Plotnikov et al. |

OTHER PUBLICATIONS

Vector Index Registers, U.S. Appl. No. 16/417,500, filed May 20, 2019, Steven Wallach, Notice of Allowance Mailed—Application Received in Office of Publications, dated Mar. 17, 2021.

True/False Vector Index Registers, U.S. Appl. No. 16/417,495, filed May 20, 2019, Steven Wallach, Docketed New Case—Ready for Examination, Sep. 28, 2021.

Conditional Operations in a Vector Processor Having True and False Vector Index Registers, U.S. Appl. No. 16/417,508, filed May 20, 2019, Steven Wallach, Notice of Allowance Mailed—Application Received in Office of Publications, dated Oct. 18, 2021.

International Search Report and Written Opinion, PCT/US2020/028805, dated Jul. 28, 2020.

International Search Report and Written Opinion, PCT/US2020/028806, dated Jul. 28, 2020.

International Search Report and Wirtten Opinion, PCT/US2020/028799, dated Jul. 30, 2020.

International Search Report and Wirtten Opinion, PCT/US2020/028798, dated Jul. 30, 2020.

Extended European Search Report, EP 20809938.2, dated May 26, 2023.

* cited by examiner

600

--- storing, in an operand vector register (OVR) in a vector processor, elements of an operand vector to be used as input for a vector operation of an ALU in the vector processor
602

↓ storing, in a vector index register (VIR) in the vector processor, a plurality of address components corresponding to a plurality of positions in the OVR
604

↓ iterating on the plurality of address components stored in the VIR according to a count from a counter to provide an output
606

↓ receiving, by a N:1 multiplexor of the processor, at least the count and the output from the VIR
608

↓ receiving, by the multiplexor, a selection input comprising a mode value, the mode value being at least a value for selection of the count or a value for selection of the output from the VIR
610

↓ selecting, by the multiplexor, at least either the count or the output from the VIR according to the received mode value
612

↓ communicating the selection to a vector load-store unit of the vector processor accessing the OVR
614

↓ adding a count stored in a counter to an effective address for accessing the OVR
616

↓ adding the address component of the VIR to an effective address for accessing a corresponding position in the OVR
618

↓ accessing the OVR for the ALU, by the vector load-store unit, according to step 616 or 618
620

FIG. 6

# REGISTERS IN VECTOR PROCESSORS TO STORE ADDRESSES FOR ACCESSING VECTORS

RELATED APPLICATION

The present application is a continuation application of U.S. patent application Ser. No. 16/417,500, filed May 20, 2019, issued as U.S. Pat. No. 11,340,904 on May 24, 2022, and entitled "VECTOR INDEX REGISTERS," the entire disclosure of which applications is hereby incorporated herein by reference.

FIELD OF THE TECHNOLOGY

In general, at least some embodiments disclosed herein relate to vector processors. Also, at least some embodiments disclosed herein relate to registers in vector processors that store addresses for accessing vectors.

BACKGROUND

A vector processor can be or include a central processing unit (CPU) that implements an instruction set containing instructions that operate on arrays of data of commonly referred to as vectors. This is different from a scalar processor, wherein instructions operate on single data items. Vector processors can greatly improve performance on certain workloads over scalar processor, notably numerical simulation and similar tasks. Vector processors appeared in the early 1970s and where a large part of supercomputing design through the 1970s into the 1990s. The rapid fall in the price-to-performance ratio of more conventional microprocessor designs, such as scalar processor designs, as led to less development and manufacturing of vector processors.

In general, conventional CPUs (e.g., scalar based CPUs) are able to manipulate a few pieces of data at a time, at most. For instance, such CPUs have an instruction that essentially provide adding A to B and store the result in C. The data for A, B and C is usually pointed to by passing in an address to a memory location that holds the data. Decoding this address and getting the data out of the memory takes some time, during which the CPU can sit idle waiting for the requested data to show up.

To reduce the amount of time consumed by these steps, more contemporary CPUs use a technique known as instruction pipelining in which the instructions pass through several sub-units in turn. The first sub-unit reads the address and decodes it, the next fetches the values at those addresses, and the next does the math itself. With pipelining, the CPU starts decoding the next instruction even before the first has left the CPU, similar to an assembly line. This way, the address decoder, and other mentioned parts are simultaneously and constantly in use. Because of the pipelining, any instruction takes the same amount of time to complete.

Vector processors improve on pipelining by, instead of pipelining merely the instructions, such processors also pipeline the data itself. Thus, instead of constantly having to decode instructions and then fetch the data needed to complete the instructions, the vector processor reads a single instruction from memory. This allows for reduced decoding time and reduced power consumption (e.g., one decode with vector processors instead of multiple decodes).

Vector processors as well as other types of processors, such as the commonly used scalar processors, include index registers for modifying operand addresses during the run of a program or operation. Often indexes are used and beneficial for doing vector or array operations. The contents of an index register can be added to or subtracted from an immediate address to form an effective address of the actual data or operand. Commonly, instructions can test the index register and, if the test fails, the instructions can reset the start of the loop. Some instruction sets allow multiple index registers to be used.

In general, it is known to use scalar registers for indexing. In other words, it is known to use scalar index registers. However, there are many limitations associated with using a scalar register for indexing. And, some of these limitations can curb the performance of a processor using the index register. For example, to access multiple positions of an operand vector, a scalar index register needs to be incremented and each incrementation needs to be separately loaded by the processor to be used for accessing the operand vector.

BRIEF DESCRIPTION OF THE DRAWINGS

The present disclosure will be understood more fully from the detailed description given below and from the accompanying drawings of various embodiments of the disclosure.

FIG. 6 illustrates example operations of method 600 for accessing elements of an operand vector, in accordance with some embodiments of the present disclosure.

DETAILED DESCRIPTION

Figure 1:
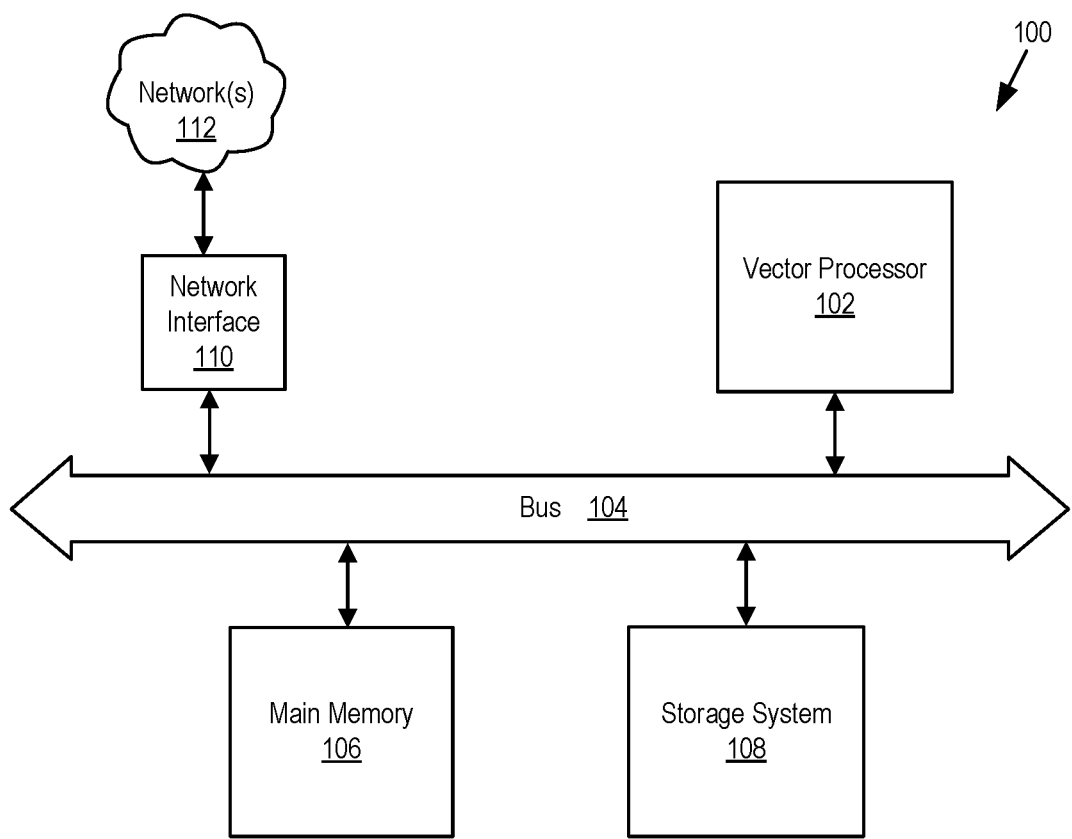
FIG. 1 illustrates example parts of an example computing device 100, in accordance with some embodiments of the present disclosure.

In general, at least some embodiments disclosed herein relate to vector processors. Also, at least some embodiments disclosed herein relate to registers in vector processors that store addresses for accessing vectors. And, at least some of the embodiments disclosed herein are vector index registers in vector processors that each store multiple addresses for accessing multiple positions in vectors.

It is known to use a scalar index register in a vector processor to reference multiple positions of vectors by changing the value stored in the scalar index register during a vector operation. However, by using a vector indexing register for indexing multiple positions of one or more operand vectors, the scalar index register can be replaced and at least the continual changing of values in the scalar index register during a vector operation can be avoided. This is just one example of a technical solution to a technical problem described herein.

A scalar or single-entry register can store an index i that allows the operation on a vector register to start at element i, or the operation can start at element zero. The subsequent parts of the operation access elements 0+1 or i+1 at each increment. On a side note, using a single-entry register that stores an index i can be used for vector first operations and indexing, which is also disclosed herein to some extent.

However, there are many limitations associated with using a scalar register or single-entry vector for indexing. And, some of these limitations can curb the performance of a vector processor using the index register. For example, to access multiple positions of an operand vector, a scalar or single-entry index register needs to be incremented and each incrementation needs to be separately loaded by the vector processor to be used for accessing the operand vector.

By using a vector indexing register for indexing a plurality of positions of one or more operand vectors, the scalar index register can be replaced and at least the continual changing of the scalar index register during a vector operation can be avoided.

In general, the embodiments disclosed herein provide specific technical solutions to at least the technical problems mentioned in the background section and other parts of the application as well as other technical problems not described herein but recognized by those of skill in the art.

In some embodiments, a vector index register (VIR) can store address components for vector operations that use selective indexing. This is somewhat analogous to vector first processing or indexing. For example, using selective indexing, a VIR can store address parts $i\_1, i\_2, \ldots, i\_n$. This allows the operations on a vector register to move through elements $i\_1, i\_2, \ldots, i\_n$ of an input vector, instead of $i, i+1, i+2, i+n$ of the input vector. For example, using selective indexing, a VIR can store non-sequential address parts $i\_1, i\_3, \ldots, i\_8$. This allows the operations on a vector register to move through non-sequential elements of an input vector.

The uses of a VIR are many. For example, a VIR can be used to implement a vector compress or expand function more efficiently. For example, when a vector comparison operation generates an index vector of selected elements, the selected components can be loaded in the VIR that can be used for addressing in the generation of the compressed vector. The elements in the VIR (or the elements in VMX(i)) are address components for accessing non-continuous elements in vector V(i). Instead of accessing V(i) through a single-entry index vector, where i=i+1 for each iteration, the vector processor can sequentially access V(VMX(i)), where i=i+1 for each iteration. Also, this way the components are only loaded once from the VIR for use by the vector processor. If a single-entry index vector is used, such as a vector first register is used, the element in the input vector is addressed by a counter that starts with the value in the single-entry index vector. To use the single-entry index register, each address is loaded sequentially from the index register. Again, with a VIR, each address or address component stored in the VIR is loaded at the same time only once. This creates a significant performance boost for the vector processor using a VIR.

In some embodiments, a counter (e.g., counter register) can drive the VIR. Also, a multiplexor, such as an N:1 multiplexor (i.e., multiple input single output multiplexor), can be used to selectively switch between outputs of the counter, to generate the output to access a certain position of the operand register for each vector iteration, or the index coming out of VIR to access a certain position of the operand register for each iteration of the counter.

The aforesaid features and other features disclosed herein can be useful in conditional operations. For example, instead of generating the vector mask register for conditional operations on a vector, one of the circuits disclosed herein can generate one or more index vectors. Then, using the index vector(s), branches of a vector mask register can be evaluated via the corresponding VIR(s) respectively. The VIR(s) speed up the processing by the vector processor because the vector mask does not need to be generated or be iterated through, and the components of the mask do not need to be separately loaded per iteration.

Such functionality can also be useful for vector expand operations and/or merging the results of vector operations into a vector register. For example, a VIR can be used for indexing in operation B(VMX(i))=A(i), wherein "B(VMX(i))" is expanded compressed vector A. Also, a VIR can be used for indexing in operation B(VMX(i))=A(i)+a, in which "B(VMX(i))" is expand compressed vector A and a scalar value "a" is added to expanded vector A. Also, a VIR can be used for indexing in operation B(VMX(i))=function (A(VMX(i)), C(VMX(i))), in which the processor preforms an operation on vectors A and C for elements selected through the VIR labeled "VMX". This is an example of conditional processing and can be used for nested conditional processing as well.

The index values or addressing components stored in a VIR (e.g., [2, 4, 5, 8]) for accessing elements within an operand vector register (OVR) can be converted to memory addresses (e.g., the base address plus increments for each memory unit). Thus, the outputs described herein, such as the outputs from the multiplexors described herein can be converted to memory addresses for accessing vectors in main memory directly, in a way similar to accessing operand vector registers (OVRs).

FIG. 1 illustrates example parts of an example computing device 100, in accordance with some embodiments of the present disclosure. The device 100 can be communicatively coupled to one or more networks 112, as shown. The device 100 includes a vector processor 102 that is in accordance with some embodiments of the present disclosure. The device 100 also includes at least a bus 104, a main memory 106, a data storage system 108, and a network interface 110. The bus 104 communicatively couples the vector processor 102, the main memory 106, the data storage system 108, and the network interface 110. The device 100 includes a computer system that includes at least vector processor 102, main memory 106 (e.g., read-only memory (ROM), flash memory, dynamic random access memory (DRAM) such as synchronous DRAM (SDRAM) or Rambus DRAM (RDRAM), static random access memory (SRAM), etc.), and data storage system 108, which communicate with each other via bus 104 (which can include multiple buses).

To put it another way, FIG. 1 is a block diagram of an example device 100 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 110) to other machines in a LAN, an intranet, an extranet, and/or the Internet (e.g., network(s) 112). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Vector processor 102 represents one or more vector processors that are in accordance with some embodiments of the present disclosure. The vector processor 102 can include a microprocessor, a central processing unit, or the like. More particularly, the vector processor 102 can include a complex instruction set computing (CISC) microprocessor, reduced instruction set computing (RISC) microprocessor, very long instruction word (VLIW) microprocessor, or a processor implementing other instruction sets, or processors implementing a combination of instruction sets, as long as the processor uses: vector instructions, vector registers, a vector first and multi-lane configuration. The vector processor 102 can also be one or more special-purpose processing devices such as an application specific integrated circuit (ASIC), a field programmable gate array (FPGA), a digital signal processor (DSP), graphics processing unit (GPU), network processor, or the like. The vector processor 102 can be configured to execute instructions for performing the operations and steps discussed herein. The vector processor 102 can further include a network interface device such as network interface 110 to communicate over one or more communications network (such as network(s) 112).

The data storage system 108 can include a machine-readable storage medium (also known as a computer-readable medium) on which is stored one or more sets of instructions or software and can embody at least some aspects of one or more of the methodologies or functions described herein. The data storage system 108 can include non-volatile storage. The instructions can also reside, completely or at least partially, within the main memory 106 and/or within the vector processor 102 during execution thereof by the computer system, the main memory 106 and the vector processor 102 also can constitute a machine-readable storage media. While the memory, vector processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 2:
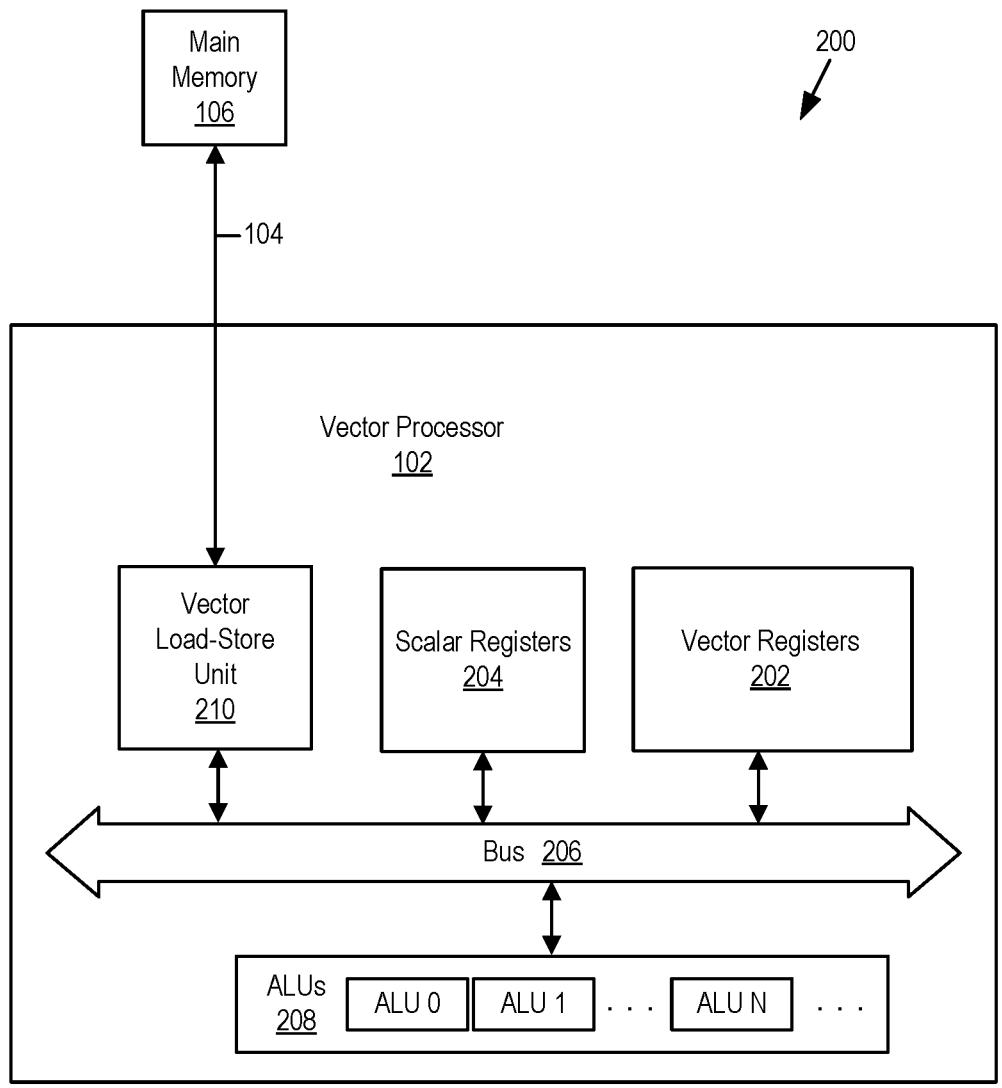
FIG. 2 illustrates example parts of an example computing device 200, in accordance with some embodiments of the present disclosure.

FIG. 2 illustrates example parts of an example computing device 200, in accordance with some embodiments of the present disclosure. As shown, computing device 200 includes vector processor 102 as well as bus 104 and main memory 106 (e.g., see FIG. 1). Computing device 200 can also be or include computing device 100.

As shown in FIG. 2, vector processor 102 includes vector registers 202, scalar registers 204, bus 206, arithmetic logic units 208 (ALUs 208), and vector load-store unit 210. Other embodiments of the computing device 200 can include the scalar registers 204 being external to the vector processor 102 or in a separate unit of the vector processor from a unit in the vector processor having the vector registers 202. The bus 206 communicatively couples vector registers 202, scalar registers 204, arithmetic logic units (ALUs) 208, and vector load-store unit 210, and such components can communicate with each other via bus 206 (which can include multiple buses). Vector registers 202 include multiple vector registers. And, ALUs 208 include multiple ALUs—e.g., arithmetic logic unit (ALU) 0, ALU 1, and ALU N.

Vector processor 102 includes at least one vector index register. Vector processor 102 can be or include one or more central processing units (CPUs) that implement instructions that operate on one-dimensional arrays of data called vectors.

Vector registers 202 in the vector processor 102 can include operand vector registers (i.e., input vector registers), result vector registers (i.e., output vector registers), and vector index registers that store values used for accessing elements in operand vector registers and/or result vector registers. The values in the accessed elements of operand vector registers and/or result vector registers can be used as input for ALUs such as one or more of the ALUs 208.

Figure 3:
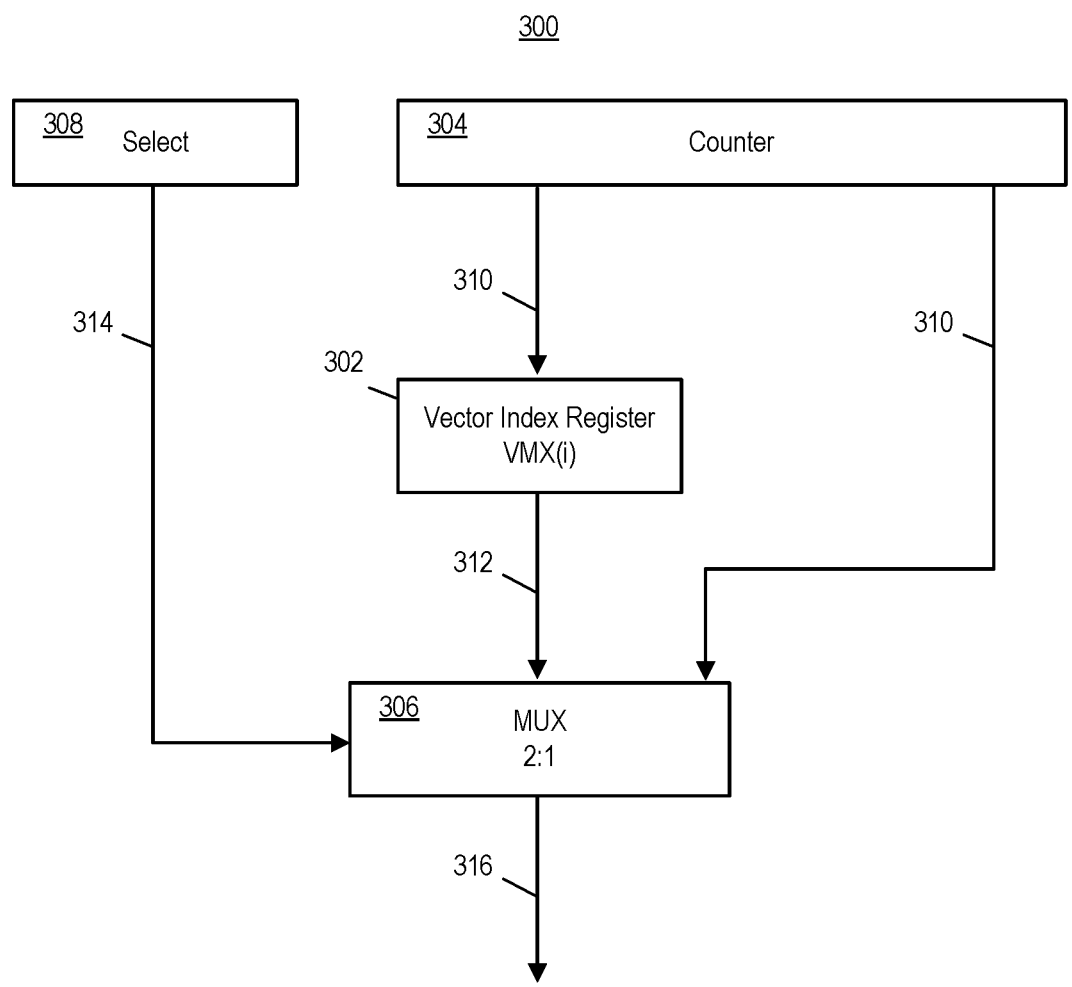
FIG. 3 illustrates an example system 300 including a vector index register 302, in accordance with some embodiments of the present disclosure.
Figure 4:
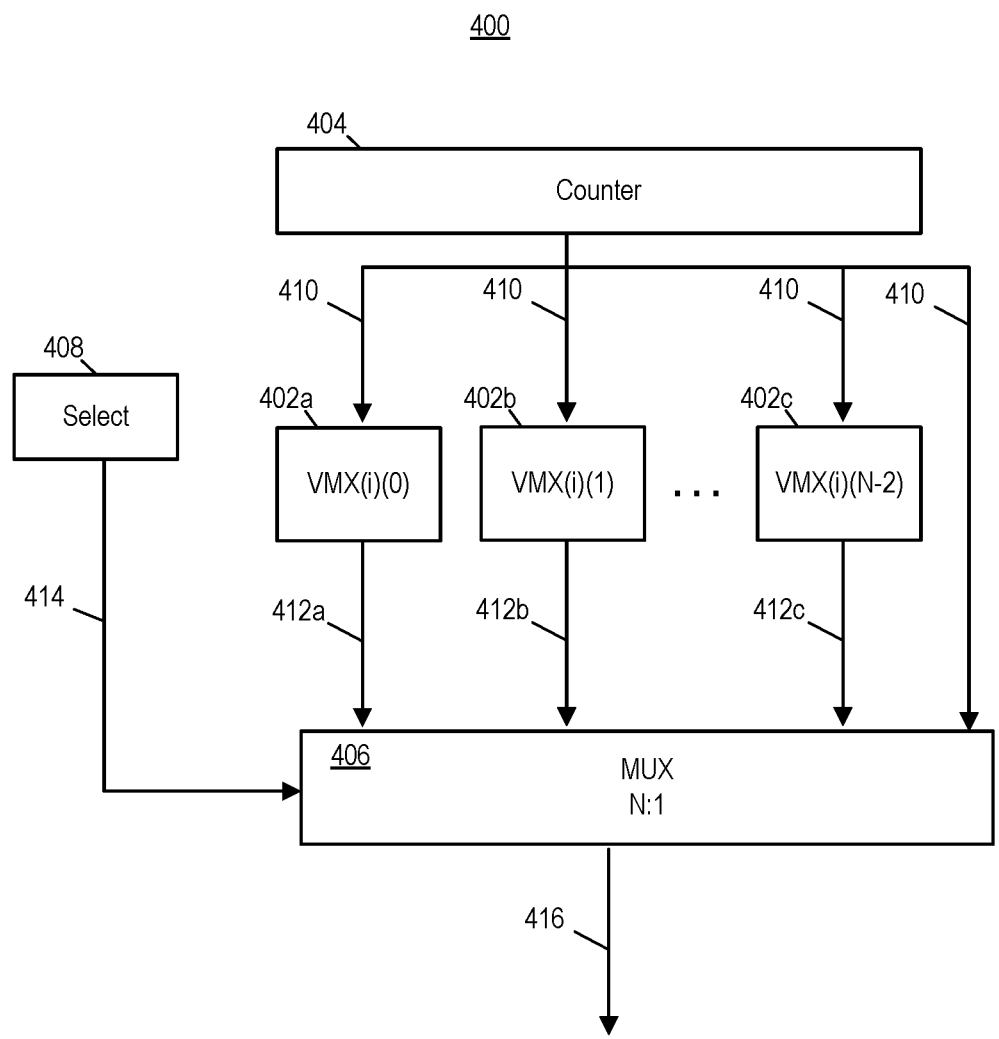
FIG. 4 illustrates an example system 400 including vector index registers 402a, 402b, and 402c, in accordance with some embodiments of the present disclosure.
Figure 5:
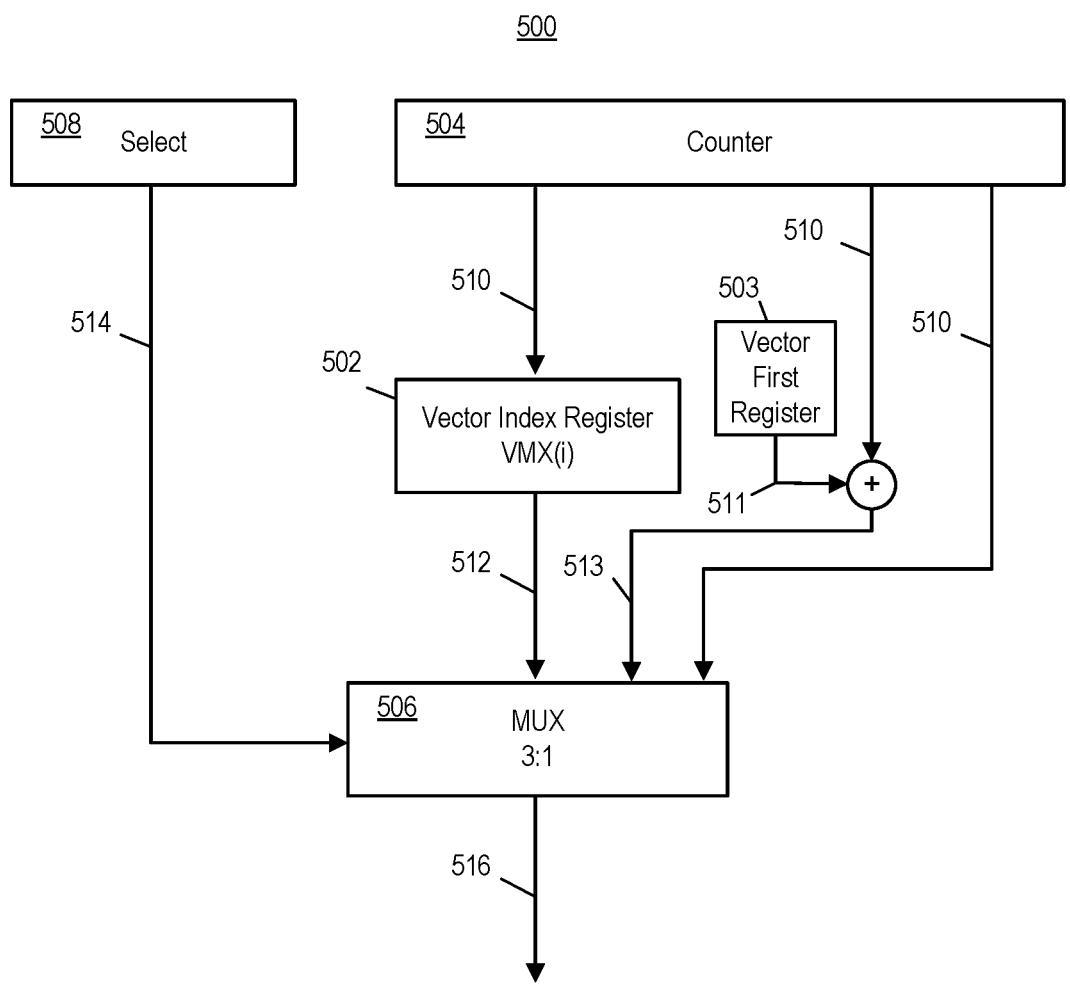
FIG. 5 illustrates an example system 500 including a vector index register 502 and a vector first register 503, in accordance with some embodiments of the present disclosure.

In general, the vector processor 102 can include index registers that can include scalar index registers and vector index registers such as the vector index registers illustrated in FIGS. 3, 4, and 5.

The scalar registers 204 of the vector processor 102 can include scalar index registers as well as operand scalar registers (i.e., input scalar registers) and result scalar resisters (i.e., output scalar registers). At least some of the scalar registers can provide indexing and control values for many different types of operations on scalars and vectors. Also, scalar registers can also provide numerical values used by the vector instructions. For example, a vector provided by a vector register can be multiplied by a scalar provided by a scalar register.

At least some of the scalar registers 204 and the vector registers 202 can be connected to respective ALUs of the ALUs 208. An ALU of ALUs 208 can include a combinational digital electronic circuit that performs arithmetic and bitwise operations on integer binary numbers. In the vector processor 102, an ALU of the ALUs 208 can be connected to input vector registers and in some instances output vector registers if the output vector register is providing feedback in an operation. In such instances the output vector register is both an input and output vector.

Also, the scalar registers 204 can include programmable scalar registers. A programmable scalar register can be used so that a vector provided by a vector register (e.g., one of the vector registers 202) can be operated on by a scalar provided by and programed into one of the programmable scalar registers. For example, one of the operations can include a vector multiplied by a scalar value (e.g., vector A(i) X scalar p).

The bus 206 depicted can be configured to communicatively couple the vector load-store unit 210, the vector registers 202, the scalar registers 204, and the arithmetic logic units 208. The bus 206 can include a 2:1 multiplexor, 3:1 multiplexor, or a N:1 multiplexor configured to receive inputs from vector index registers and to output an address or address component for access of an operand vector. (e.g., see FIGS. 3, 4, and 5).

Vector load-store unit 210 includes circuitry for executing load and store instructions, generating addresses of load and store vector operations and loading data from memory or storing it back to memory from the registers of the vector processor 102. Vector load-store unit 210 can perform many of the operations described herein including many of the operations of methods 600, 700, 900, and 1000 in FIGS. 6-10.

Each of the computing devices described herein can be a machine capable of executing a set of instructions (sequential or otherwise) that specify actions to be taken by that machine. Further, while a single machine is illustrated for each of the illustrated computing devices of FIGS. 1 and 2, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Before the discussion of the systems 300, 400, and 500 depicted in FIGS. 3, 4, and 5, it is important to understand that elements in a vector register can be addressed using at least an index coming out of a vector index register (VIR) or another type of register such as a counter register. In general, when a counter register is used, the counter adds 1 to itself for each iteration or step in a DO or FOR loop that generates the address for the next iteration or step. The VIR does not have to be driven by a counter, but it can be useful to have the VIR driven by a counter. A common counter can do both of driving the VIR and can provide a separate input to a receiving multiplexor that outputs an address component for use in accessing an operand vector in a vector operation.

For example, a VIR can store a vector VMX, where VMX(i), and i=0, 1, . . . , n−1. A simple example of an application of use of the VIR would be a compress operation such as B(i)=A(VMX(i)). Also, when another vector register stores a vector A, its elements are A(i), where i=0, 1, 2, . . . n. In a regular mode (such as when the counter output is selected for use by a multiplexor), the processor can do A +a, where "a" is a scaler from the counter via the multiplexor. The result is stored in an output vector register B, where B(i)=A(i)+a, and where i=0, 1, . . . , n−1. In the mode using the VIR (e.g., an alternative selection control of the multiplexor), the processor can do A(VMX)+a by using the addresses generated from the output of the VIR. Thus, the output vector register has B, where B(i)=A(VMX(i))+a, and where i=0, 1, . . . , n−1. Also, for example, the vector processor can be configured to operate on two vectors, e.g., B(i)=function (A(VMX(i)), C(VMX(i))), where the "function" is implemented via an ALU.

FIG. 3 illustrates an example system 300 including a vector index register 302, in accordance with some embodiments of the present disclosure.

The system 300 can be a part of vector processor 102 (e.g., see FIG. 1 or 2) or multiple vector processors. System 300 includes the vector index register 302 (VIR 302), a counter register 304, a 2:1 multiplexor 306, and a select register 308 connected to the multiplexor. The VIR 302 can be one of the vector registers 202 shown in FIG. 2. The counter register 304 and the select register 308 can be registers of the scalar registers 204. The 2:1 multiplexor 306 can be a part of the bus 206 shown in FIG. 2 or the bus 104 shown in FIG. 1.

The system 300 can be part of a vector processor that includes an arithmetic logic unit (ALU) of a plurality of arithmetic logic units (ALUs). The vector processor can also include an operand vector register (OVR) of a plurality of operand vector registers. The OVR can be configured to store elements of an operand vector to be used as input for a vector operation of the ALU.

The VIR 302 can be configured to store a plurality of address components corresponding to a plurality of positions in the OVR. Each address component can be addable to an effective address for accessing a corresponding position in the OVR. Each position of the OVR can include an element of the operand vector to be operated upon by the ALU.

In some embodiments, an example OVR can be 64 bits in length. If an operand is less than 64 bits (for example a 32-bit integer) that operand can be right justified. In such an example, the indexing techniques described herein are similarly applied. For example, the OVR can include padding in its elements to accommodate different data types.

As shown, the counter register 304 is part of the system 300. The counter register 304 can also be a part of the vector processor having the system 300. The counter register 304 can be configured to store a count 310. The count 310 can be addable to an effective address for accessing the OVR or the count can be used by the vector processor for iterating on the plurality of address components stored in the VIR 302.

As shown, the 2:1 multiplexor 306 is part of the system 300. The 2:1 multiplexor 306 can also be a part of the vector processor having the system 300. The 2:1 multiplexor 306 can be configured to receive, as inputs, the count 310 from the counter register 304 and an output 312 from the VIR 302. The output 312 from the VIR 302 can include one of the plurality of address components of the VIR corresponding to the count 310. The 2:1 multiplexor 306 can also be configured to receive, as a selection input, a mode value 314. The mode value 314 can be or include a value for selection of the count 310 or a value for selection of the output 312 from the VIR 302. The 2:1 multiplexor 306 can also be configured to select either the count 310 or the output 312 from the VIR 302 according to the received mode value 314. The 2:1 multiplexor 306 can also be configured to output and communicate, via a bus (such as one of the buses of FIG. 1 or 2), a selection output 316 that is one of the selected count or the selected output from the VIR. The selection output 316 can be communicated to a requester accessing the OVR for the ALU. The requester can be a vector load-store unit of the vector processor (e.g., see vector load-store unit 210 shown in FIG. 2), or a vector load-store unit of another vector processor.

When the requester is a vector load-store unit it can be configured to generate effective addresses of load and store operations of the vector processor. The vector load-store unit can also be configured to, for each address component of the VIR, add the address component of the VIR to an effective address for accessing a corresponding position in the OVR.

FIG. 4 illustrates an example system 400 including vector index registers 402a, 402b, and 402c, in accordance with some embodiments of the present disclosure.

The system 400 can be a part of vector processor 102 (e.g., see FIG. 1 or 2) or multiple vector processors. System 400 includes multiple vector index registers including the vector index registers 402a, 402b, and 402c (VIRs 402a, 402b, and 402c). The system 400 also includes a counter register 404, a N:1 multiplexor 406, and a select register 408 connected to the multiplexor. The VIRs 402a, 402b, and 402c can be vector registers of the vector registers 202 shown in FIG. 2. The counter register 404 and the select register 408 can be registers of the scalar registers 204. The N:1 multiplexor 406 can be a part of the bus 206 shown in FIG. 2 or the bus 104 shown in FIG. 1. The N:1 multiplexor 406 is a multiplexor that can receive at least four inputs as shown. But, in some embodiments, the multiplexor 406 can receive much more than four inputs. The N:1 multiplexor 406 outputs one output which can be an address component used for accessing an operand vector register (OVR).

The system 400 can be part of a vector processor that includes an ALU ALUs. The vector processor can also include an OVR of OVRs. The OVR can be configured to store elements of an operand vector to be used as input for a vector operation of the ALU.

The VIRs 402a, 402b, and 402c each can be configured to store a plurality of address components corresponding to a plurality of positions in the OVR or three separate OVRs, for example. In an example with multiple OVRs there can be a separate multiplexor for each OVR. Also, in an example with multiple OVRs there can be a separate addressing system, such as system 300, for each OVR. Each address component of the multiple VIRs (e.g., VIRs 402a, 402b, and 402c) can be addable to an effective address for accessing a corresponding position in the OVR or multiple OVRs. Each position of the OVR(s) can include an element of the operand vector to be operated upon by the ALU.

As shown, the counter register 404 is part of the system 400. The counter register 404 can also be a part of the vector processor having the system 400. The counter register 404 can be configured to store a count 410. The count 410 can be addable to an effective address for accessing one or more OVRs or the count can be used by the vector processor for iterating on the plurality of address components stored in multiple VIRs (e.g., VIRs 402a, 402b, and 402c).

As shown, the N:1 multiplexor 406 is part of the system 400. The N:1 multiplexor 406 can also be a part of the vector processor having the system 400. The N:1 multiplexor 406 can be configured to receive, as inputs, the count 410 from the counter register 404 and outputs (e.g., outputs 412a, 412b, and 412c) from multiple VIRs (e.g., VIRs 402a, 402b, and 402c). Outputs 412a, 412b, and 412c from the VIRs 402a, 402b, and 402c each can include one of the plurality of address components of the respective VIR corresponding to the count 410. The N:1 multiplexor 406 can also be configured to receive, as a selection input, a mode value 414. The mode value 414 can be or include a value for selection of the count 410 or a value for selection of the outputs 412a, 412b, and 412c from the VIRs 402a, 402b, and 402c, for example. The N:1 multiplexor 406 can also be configured to select either the count 410 or the outputs 412a, 412b, and 412c from the VIRs 402a, 402b, and 402c according to the received mode value 414. The N:1 multiplexor 406 can also be configured to output and communicate, via a bus (such as one of the buses of FIG. 1 or 2), a selection output 416 that is one of the selected count or the selected output from the VIRs. The selection output 416 can be communicated to a requester accessing the OVR or multiple OVRs for the ALU or multiple ALUs. The requester can be a vector load-store unit of the vector processor (e.g., see vector load-store unit 210 shown in FIG. 2), or a vector load-store unit of another vector processor. When the requester is a vector load-store unit it can be configured to generate effective addresses of load and store operations of the vector processor. The vector load-store unit can also be configured to, for each address component of the VIRs, add the address component to an effective address for accessing a corresponding position in the OVR(s).

In some embodiments, a vector processor having multiple VIRs can include a counter configured to store a count and the count is addable to an effective address for accessing the OVR or wherein the count is for iterating on each respective plurality of address components stored in the VIRs. In such examples, the processor can also include a N:1 multiplexor configured to receive, as inputs, the count from the counter and respective outputs from the VIRs. Each output from a given VIR of the VIRs can include one of a plurality of address components of the given VIR corresponding to the count. The multiplexor can also be configured to receive, as a selection input, a mode value. The mode value can be a value for selection of the count or a value for selection of one of the respective outputs from the VIRs. The multiplexor can also be configured to select either the count or one of the respective outputs from the VIRs according to the received mode value. The multiplexor can also be configured to communicate the selected count or selected one of the respective outputs from the VIRs to a requester (e.g., such as vector load-store unit of the vector processor) accessing the OVR for the ALU.

FIG. 5 illustrates an example system 500 including a vector index register 502, in accordance with some embodiments of the present disclosure.

The system 500 can be a part of vector processor 102 (e.g., see FIG. 1 or 2) or multiple vector processors. System 500 includes the vector index register 502 (VIR 502), a counter register 504, a 3:1 multiplexor 506, and a select register 508 connected to the multiplexor. System 500 also includes the vector first register 503 connected to the multiplexor 506. The VIR 502 can be one of the vector registers 502 shown in FIG. 2. The counter register 504, the select register 508, and the vector first register 503 (VFR 503) can be registers of the scalar registers 204. The 3:1 multiplexor 506 can be a part of the bus 206 shown in FIG. 2 or the bus 104 shown in FIG. 1.

The system 500 can be part of a vector processor that includes an arithmetic logic unit (ALU) of a plurality of arithmetic logic units (ALUs). The vector processor can also include an operand vector register (OVR) of a plurality of operand vector registers. The OVR can be configured to store elements of an operand vector to be used as input for a vector operation of the ALU. The VIR 502 can be configured to store a plurality of address components corresponding to a plurality of positions in the OVR. Each address component can be addable to an effective address for accessing a corresponding position in the OVR. Each position of the OVR can include an element of the operand vector to be operated upon by the ALU.

The VFR 503 can be configured to store a single address component 511. The single address component 511 is an address component that directs initial access of the OVR at an initial position of the OVR based on the single address component 511 such that the initial position accessed is not the first position of the OVR. For example, if the VFR 503 stores the scalar "3", then a fourth position of the OVR is initially accessed during a vector operation of the OVR. This is instead of starting access of the OVR at the first position of the OVR (e.g., OVR(0)).

As shown, the counter register 504 is part of the system 500. The counter register 504 can also be a part of the vector processor having the system 500. The counter register 504 can be configured to store a count 510. The count 510 can be addable to an effective address for accessing the OVR or the count can be used by the vector processor for iterating on the plurality of address components stored in the VIR 502. Also, the count 510 can be used by the vector processor for incrementing the single address component 511 of the VFR 503 or as shown, it can be added to the single address component 511 and the summation of the count 510 and the single address component 511 is vector first address component 513.

As shown, the 3:1 multiplexor 506 is part of the system 500. The 3:1 multiplexor 506 can also be a part of the vector processor having the system 500. The 3:1 multiplexor 506 can be configured to receive, as inputs, the count 510 from the counter register 504 and an output 512 from the VIR 502 as well as the vector first address component 513 of the summation of the output of the VFR 503 and the counter 504. The output 512 from the VIR 502 can include one of the plurality of address components of the VIR corresponding to the count 510. The 3:1 multiplexor 506 can also be configured to receive, as a selection input, a mode value 514. The mode value 514 can be or include a value for selection of the count 510 or a value for selection of the output 512 from the VIR 502 or a value for selection of the vector first address component 513 of the summation of the output of the VFR 503 and the counter 504. The 3:1 multiplexor 506 can also be configured to select either the count 510 or the output 512 from the VIR 502 or the vector first address component 513 according to the received mode value 514. The 3:1 multiplexor 506 can also be configured to output and communicate, via a bus (such as one of the buses of FIG. 1 or 2), a selection output 516 that is one of the selected count or the selected output from the VIR or the vector first address component 513. The selection output 516 can be communicated to a requester accessing the OVR for the ALU. The requester can be a vector load-store unit of the vector processor (e.g., see vector load-store unit 210 shown in FIG. 2), or a vector load-store unit of another vector processor. When the requester is a vector load-store unit it can be configured to generate effective addresses of load and store operations of the vector processor. The vector load-store unit can also be configured to, for each address component of the VIR, add the address component of the VIR to an effective address for accessing a corresponding position in the OVR.

In some embodiments, a vector processor having at least one VIR can also include at least one VFR as well as at least one respective counter connected to the VIR and the VFR. The counter can be configured to store a count. The count can be addable to an effective address for accessing the OVR. The count can be for incrementing the vector first address component, or the count is for iterating on the plurality of address components stored in the VIR. The vector processor can also include a 3:1 multiplexor configured to receive, as inputs, the count from the counter, an output from the VFR, and an output from the VIR. The output from the VIR can include one of the plurality of address components of the VIR corresponding to the count, and the vector first address component can correspond to the count too. The multiplexor can be configured to receive, as a selection input, a mode value. The mode value can be a value for selection of the count, a value for selection of the output from the VFR, or a value for selection of the output from the VIR. The multiplexor can be configured to select either the count, the output from the VFR, or the output from the VIR according to the received mode value, and to communicate the selected count, the selected output from the VFR, or the selected output from the VIR to a requester (e.g., such as vector load-store unit of the vector processor) accessing the OVR for the ALU.

Not shown in FIGS. 3-5, the systems can include respective vector length registers for each VIR of the VIRs. Each respective vector length register can be configured to store a length of a vector stored in a corresponding VIR. For example, the system 300 can include a vector length register (VLR) configured to store a length of a vector stored in the VIR. The VLRs can be useful in some operations leveraging the use of VIRs for address generation in vector operations.

In some embodiments, the result of the summation of the output of a counter and the output of an alternative address candidate can be multiplexed with the output of a VIR and/or the counter (e.g., see the vector first address component 513 in FIG. 5, which is the summation of the output of the counter 504 and the single address component 511 stored in the VFR 503). Alternatively, the alternative address candidate (e.g., the address component stored in VFR 503) can be used to set the initial value of a counter. The counter set by the alternative address candidate, in the alternative embodiment, is a separate counter from a counter driving a VIR.

In some embodiments, a vector processor having one of the systems 300, 400, or 500 can further include a vector load-store unit configured to generate effective addresses of load and store operations of the vector processor. The vector load-store unit can also be configured to, for each address component of a VIR, add the address component of the VIR to an effective address for accessing a corresponding position in an OVR. The effective address and the values in the VLR can be used by some vector operations to enhance the performance of the operations.

In some embodiments, a vector load-store unit connected to one of the systems 300, 400, or 500 is configured to load an operand vector stored in the OVR as well as load a scalar stored in a scalar register. Such a vector load-store unit can also be configured to compare elements of the loaded operand vector with the loaded scalar as well as store, in the VIR, positions of the elements of the loaded operand vector according to the comparison. For example, the vector load-store unit can also be configured to store position of the elements that match a scalar, store position of the elements that are greater than the scalar, or store position of the elements that are greater than or equal to the scalar. Also, for example, vector load-store unit can be configured to store the positions of the elements that are even, and not store those that are odd, or vice versa.

The vector load-store unit connected to one of the systems 300, 400, or 500 can also be configured to load, from the VIR, the stored positions of the elements of the loaded operand vector. And, the vector load-store unit can be configured to iterate a vector operation over the elements of the loaded operand vector according to the loaded positions stored in the VIR.

In some embodiments, the vector operation is a compress operation configured to store the elements of the loaded operand vector into an output OVR that correspond to the loaded positions stored in the VIR.

In some embodiments, the vector load-store unit can be configured to load the stored elements from the output OVR, and then iterate a second vector operation over the stored elements from the output OVR according to the loaded positions stored in the VIR. The second vector operation can be an expand operation configured to store the elements from the output OVR into a second output OVR at positions of the second output OVR according to the loaded positions stored in the VIR. The expand operation can also be further configured to store a scalar into the second output OVR at other positions of the second output OVR.

In some embodiments, the vector load-store unit can be configured to iterate a second compress operation over elements of a second loaded operand vector according to loaded positions stored in a second VIR. In such embodiments, the vector load-store unit can be configured to store the elements of the second loaded operand vector into a second output OVR that correspond to the loaded positions stored in the second VIR. And, the vector load-store unit can be configured to perform one or more vector operations using the elements from the first output OVR and the second output OVR.

In some embodiments, vector load-store unit can be configured to perform one or more vector operations using the elements from the first output OVR and/or the second output OVR and elements of a third operand vector stored in a third OVR that is sequentially accessed and was not generated by indexing of a VIR. The results of the operation(s) can be stored in a fourth OVR sequentially.

As mentioned the systems 300, 400, and 500 can be a part of one or more vector processors. The systems 300, 400, and 500 can also be sub-systems of a greater system of one or more vector processors.

For example, the systems 300, 400, and 500 can be included in another system or connected to another system of one or more vector processors. Such a system may also not be a part of a vector processor.

Disclosed herein is also a system that can include an ALU of a plurality of ALUs. The system can also include an OVR of a plurality of operand vector registers (OVRs). The OVR can be configured to store elements of an operand vector to be used as input for a vector operation of the ALU. The system can also include a VIR of a plurality of vector index registers (VIRs). The VIR can be configured to store a plurality of address components corresponding to a plurality of positions in the OVR. Each address component can be addable to an effective address for accessing a corresponding position in the OVR. And, each position of the OVR can include an element of the operand vector to be operated upon by the ALU.

The system can also include a counter (or a counter register). The counter can be configured to store a count. The count is at least addable to an effective address for accessing the OVR or for iterating on the plurality of address components stored in the VIR.

The system can also include a N:1 multiplexor. In other words, the system, can include a multiplexor with multiple inputs and one output. The N:1 multiplexor can be configured to receive, as inputs, at least the count from the counter and an output from the VIR. The output from the VIR can include one of the plurality of address components of the VIR corresponding to the count. The N:1 multiplexor can also be configured to receive, as a selection input, a mode value, the mode value being at least a value for selection of the count or a value for selection of the output from the VIR. The N:1 multiplexor can also be configured to select at least either the count or the output from the VIR according to the received mode value. The N:1 multiplexor can also be configured to output and communicate the selection to a vector load-store unit accessing the OVR for the ALU.

In some embodiments, the count can also be for incrementing an address component of a scalar index register for accessing the OVR. In such examples, the N:1 multiplexor can be further configured to receive, as inputs, at least the count from the counter, an output from the VIR, and an output from the scalar index register. The N:1 multiplexor can be also further configured to receive, as a selection input, a mode value, the mode value being at least a value for selection of the count, a value for selection of the output from the VIR, or a value for selection of the output from the scalar index register. The N:1 multiplexor can also be further configured to select at least either the count, the output from the VIR, or the output from the scalar index register, according to the received mode value.

In some embodiments, the scalar index register can be a vector first register (VFR). The VFR can be configured to store a vector first address component. The vector first address component can be an address component that directs initial access of the OVR at an initial position of the OVR based on the vector first address component such that the initial position accessed is not the first position of the OVR. The VFR can be used to access an OVR initially at any position of the OVR based on the value stored in the VFR.

In some embodiments, the count can also be for iterating on a plurality of address components stored in a second VIR of the VIRs. In such examples, the N:1 multiplexor can be configured to receive, as inputs, at least the count from the counter, an output from the VIR, and an output from the second VIR. Also, the N:1 multiplexor can be configured to receive, as a selection input, a mode value, the mode value being at least a value for selection of the count, a value for selection of the output from the VIR, or a value for selection of the output from the second VIR. And, the N:1 multiplexor can be configured to select at least either the count, the output from the VIR, or the output from the second VIR, according to the received mode value.

FIGS. 6-10 illustrate example operations, in accordance with some embodiments of the present disclosure. In some embodiments, a vector load-store unit, such as vector load-store unit 210, can perform or facilitate, solely or in combination with other parts of the vector processor, many or all of the operations illustrated in FIGS. 6-10. In some embodiments, storing, loading, determinations, incrementations, and changes to values describe herein can be performed by a vector load-store unit of the vector processor according to instructions stored in the vector load-store unit. In some other embodiments, other parts of the vector processor can perform or facilitate the operations illustrated in FIGS. 6-10 as well as other operations described herein.

In general, the systems described herein can implement many functions including vector compress and expand functions. For example, in a list of address components stored in a VIR, such as VMX, the elements of a given vector A can be compressed into a new vector by reading the elements A(VMX(i)) out of the vector A and store into the output vector B(i). Thus, vector A is compressed into B by B(i)=A (VMX(i)), for i=0, 1, . . . n. Similarly, the expand can be done in reverse (e.g., B(VMX(i))=A(i)). Further, one or more VIRs can allow the vector processor to perform sparse operations directly, with or without compress and/or expand. For example, a VIR can implement indexing in B(i)=function (A(VMX(i)), C(VMX(i))), which can be a sparse operation with compress. Also, a VIR can implement indexing in B(VMX(i))=function (A(VMX(i)), C(VMX(i))), which can be a sparse operation without compress. Also, a VIR can implement indexing in B(VMX(i))=function (A(i), C(i)), which can be an operation on compressed vectors with expand.

FIG. 6 illustrates example operations of method 600 for accessing elements of an operand vector for one or more vector operations, in accordance with some embodiments of the present disclosure.

In FIG. 6, the method 600 begins at step 602, with storing, in an operand vector register (OVR) of a plurality of operand vector registers (OVRs) in a vector processor, elements of an operand vector to be used as input for a vector operation of an arithmetic logic unit (ALU) of a plurality of arithmetic logic units (ALUs) in the vector processor. The storing of the elements of the operand vector in the OVR can occur any time before it is used as input for the vector operation of the ALU. For example, the step 602 can occur after step 618.

At step 604, the method 600 continues with storing, in a vector index register (VIR) of a plurality of vector index registers (VIRs) in the vector processor, a plurality of address components corresponding to a plurality of positions in the OVR.

At step 606, the method 600 continues with iterating on the plurality of address components stored in the VIR according to a count (such as a count stored in a counter register), to provide an output. Subsequently the vector load-store unit adds an output from the VIR to the effective address for accessing the OVR. The output from the VIR can include one of the plurality of address components of the VIR corresponding to the count. A single iteration over the plurality of address components stored in the VIR according to the count can occur each time the vector load-store unit requests an output from the VIR for adding the output of the VIR to the effective address for accessing the OVR. This can occur repeatedly until the VIR has been iterated through for an operation on the OVR.

At step 608, the method 600 continues with receiving, by a N:1 multiplexor of the vector processor, at least the count from the counter and an output from the VIR, wherein the output from the VIR can include one of the plurality of address components of the VIR corresponding to the count.

At step 610, the method 600 continues with receiving, by the N:1 multiplexor, a selection input including a mode value, the mode value being at least a value for selection of the count or a value for selection of the output from the VIR.

At step 612, the method 600 continues with selecting, by the N:1 multiplexor, at least either the count or the output from the VIR according to the received mode value.

At step 614, communicating the selection to a vector load-store unit of the vector processor accessing the OVR for the ALU.

At step 616, the method 600 continues with adding a count stored in a counter to an effective address for accessing the OVR.

At step 618, the method 600 continues with adding an address component of the VIR to an effective address for accessing a corresponding position in the OVR. Each position of the OVR can include an element of the operand vector to be operated upon by the ALU.

At step 620, the method 600 continues with accessing the OVR for the ALU, by the vector load-store unit, according to the effective address generated at step 616 or 618.

Figure 7:
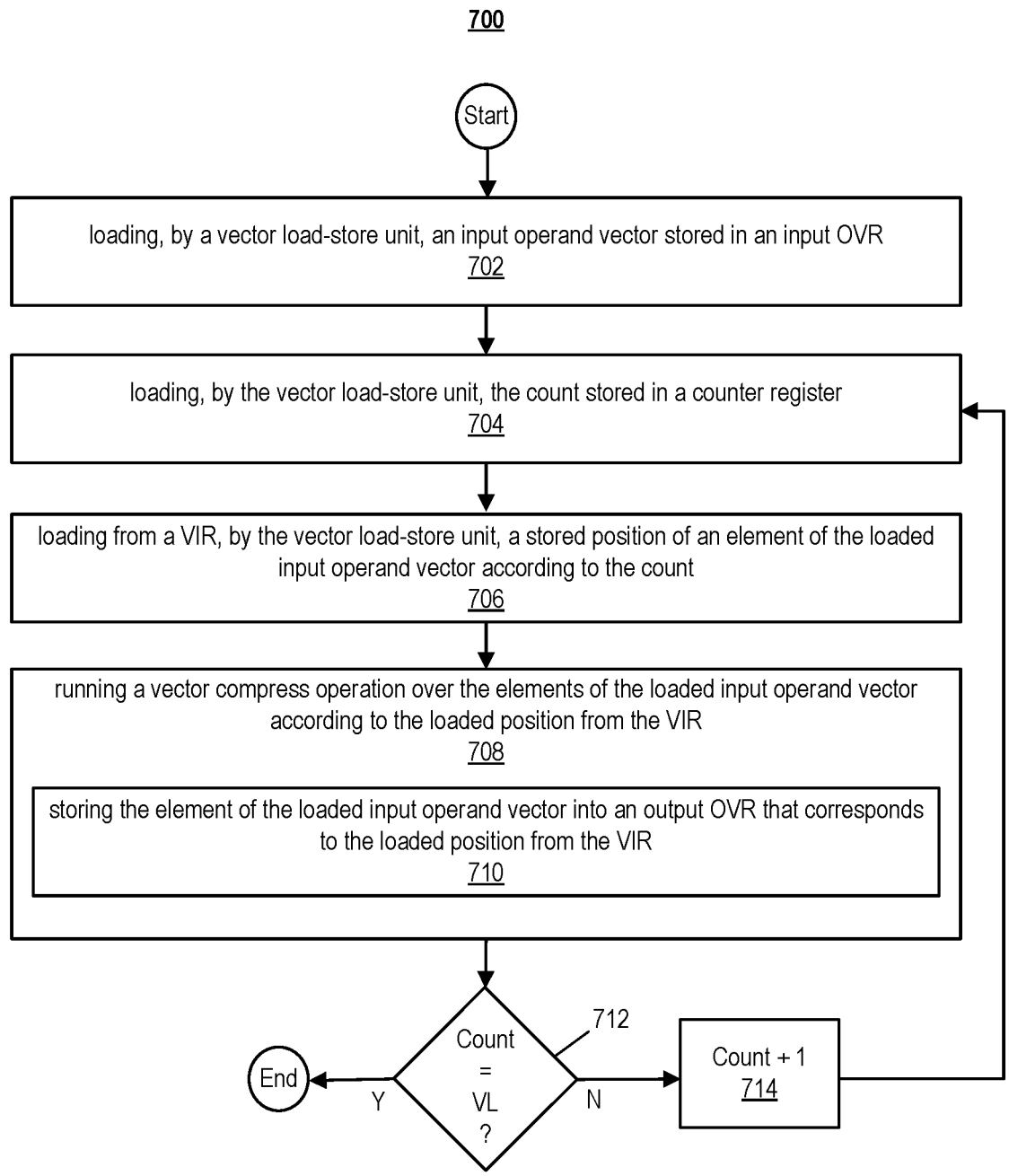
FIG. 7 illustrates example operations of method 700 for compressing elements of an operand vector, in accordance with some embodiments of the present disclosure.

FIG. 7 illustrates example operations of method 700 for compressing elements of an operand vector, in accordance with some embodiments of the present disclosure. In FIG. 7, the method 700 begins at step 702, with loading, by a vector load-store unit, an input operand vector stored in an input OVR.

At step 704, the method 700 continues with loading, by the vector load-store unit, the count stored in a counter register.

At step 706, the method 700 continues with loading from a VIR, by the vector load-store unit, a stored position of an element of the loaded input operand vector according to the count.

At step 708, the method 700 continues with running a vector compress operation over the elements of the loaded input operand vector according to the loaded position from the VIR. Step 708 includes step 710 that includes the method 700 continuing with storing the element of the loaded input operand vector into an output OVR that corresponds to the loaded position from the VIR.

At step 712, the method 700 continues with comparing the count to a value representing the vector length of the VIR (i.e., VL) such that the vector compress operation can be iterated over the input OVR for each of the positions stored in the VIR. When the count equals the vector length of the VIR, then the method 700 ends. When the count is less than the vector length of the VIR, then the method 700 continues with incrementing the count at 714 and then returning to step 704 (loading the count stored in a counter register) which is followed by steps 706 (loading from a VIR, by the vector load-store unit, a stored position of an element of the loaded input operand vector according to the count) and 708 (running the vector compress operation over the elements of the loaded input operand vector according to the loaded position from the VIR). This way the vector compress operation is iterated over the input OVR for each of the positions stored in the VIR.

Figure 8:
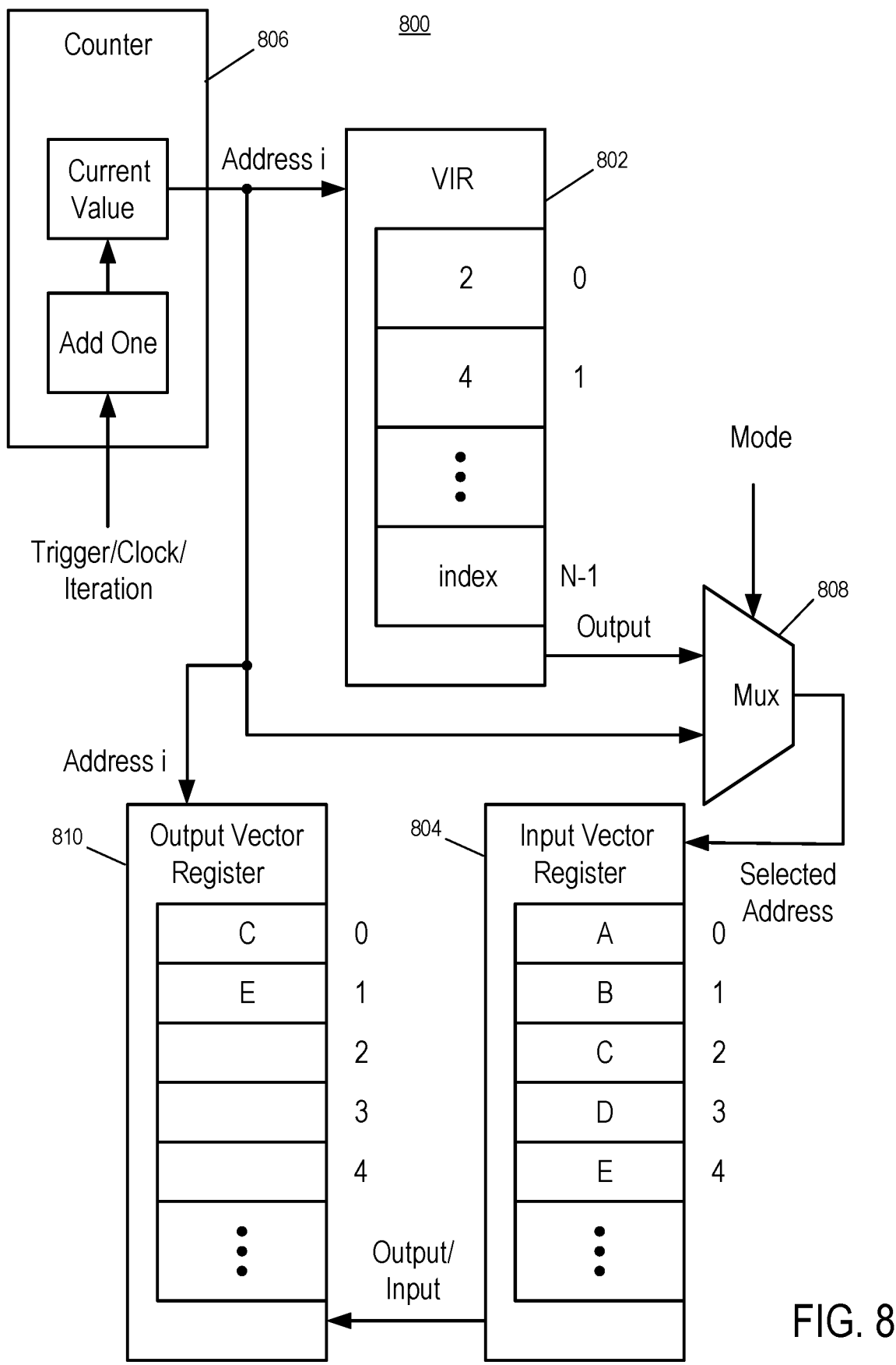
FIG. 8 illustrates an example system 800 including a vector index register 802 being used for compressing elements of an input operand vector stored in an input OVR 804, in accordance with some embodiments of the present disclosure.

FIG. 8 illustrates an example system 800 including a vector index register 802 (VIR 802) being used for compressing elements of an input operand vector stored in an input OVR 804, in accordance with some embodiments of the present disclosure. Example system 800 is one example of a system that can implement at least method 700.

In FIG. 8, the VIR 802 stores a list of positions of the input OVR 804 (e.g., "2" as the input OVR's first element, and "4" as the input OVR's second element). In this illustrated example, it is shown that the vector processor runs for two cycles or iterations of a vector compress operation. At the first iteration, counter 806 outputs the count of "0" which is the value stored in the counter at the first cycle. In the first cycle, VIR 802 is shown outputting "2". The multiplexor 808 selects between the address component ("0") as specified by the counter 806 in a normal mode operation or the address component ("2") as specified by the VIR 802 in a VIR mode of operation (or a compress mode of operation in this specific example). When the VIR (or compress mode) is selected by the multiplexor 808 in the first cycle the output of "2" from the VIR 802 is the address component used for accessing the input OVR 804. As a result, the input OVR 804 is accessed for an output of element "C" at position "2" of the input OVR. The output OVR 810 is addressed directly though the count stored in the counter 806. Since the count of the counter 806 is "0" in the first cycle, the output ORV 810 stores "C" as its first element. In the next iteration or cycle, the output ORV 810 stores "E" as a second element at position "1" of the output OVR. In this example with two cycles show, the input OVR 804 having elements of {A, B, C, D, E} is compressed into the output OVR 810 having elements of {C, E}.

Figure 9:
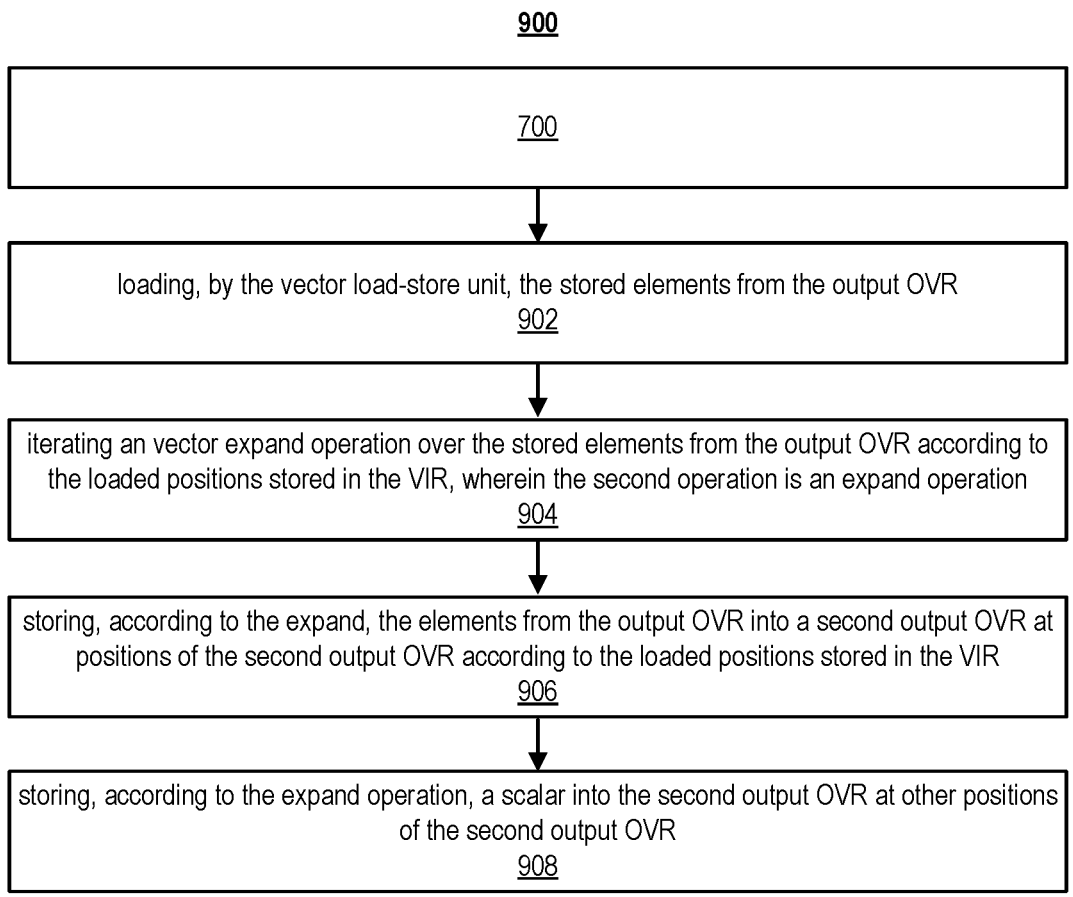
FIG. 9 illustrates example operations of method 900 for expanding elements of an operand vector, such as elements of a compressed operand vector, in accordance with some embodiments of the present disclosure.

Also, in reference to FIG. 8, if the address signals for the input/output vectors are reversed, {C, E} can be expanded into a second output OVR having element of {x, x, C, x, E} where x is the existing values before the compress operation or a scalar value selected from a scalar register (e.g., see FIG. 9 which is an example method expanding a compressed vector with a scalar value from a scalar register).

Further, if a value from a VFR is added to the count of the counter, the summation can be used so that the first iteration of an operation on the input OVR occurs at another position of the input OVR instead of the first position of the input OVR (e.g., the first position of input OVR 804 is labeled "0"). E.g., see FIG. 5. Alternatively, the VFR can be used to provide an input for the count register so that the initial value of the count register at the beginning of a vector operation is the value stored in the VFR. Such options allow for vector first processing.

FIG. 9 illustrates example operations of method 900 for expanding elements of an operand vector, such as elements of a compressed operand vector, in accordance with some embodiments of the present disclosure.

As shown in FIG. 9, the method 900 can begin with method 700, which concludes with an output of a compressed operand vector stored in the output OVR. Next, the method 900 continues at step 902, with loading, by the vector load-store unit, the stored elements from the output OVR. The stored elements being elements of a compressed vector.

At step 904, the method 900 continues with iterating a second vector operation over the stored elements from the output OVR according to the loaded positions stored in the VIR. The second operation is a vector expand operation. In other words, the second vector operation, being a vector expand operation, expands the compressed vector stored in the output OVR.

At step 906, the method 900 continues with storing, according to the expand operation, the elements from the output OVR into a second output OVR at positions of the second output OVR according to the loaded positions stored in the VIR.

At step 908, the method 900 continues with storing, according to the expand operation, a scalar into the second output OVR at other positions of the second output OVR. The final output of the expand operation after step 908 is an expanded vector with the elements from the compressed vector and one or more instances of the scalar value at other positions of the expanded vector. The positioning of the elements from the compressed vector in the expanded vector correspond to the loaded positions or address components stored in the VIR.

Figure 10:
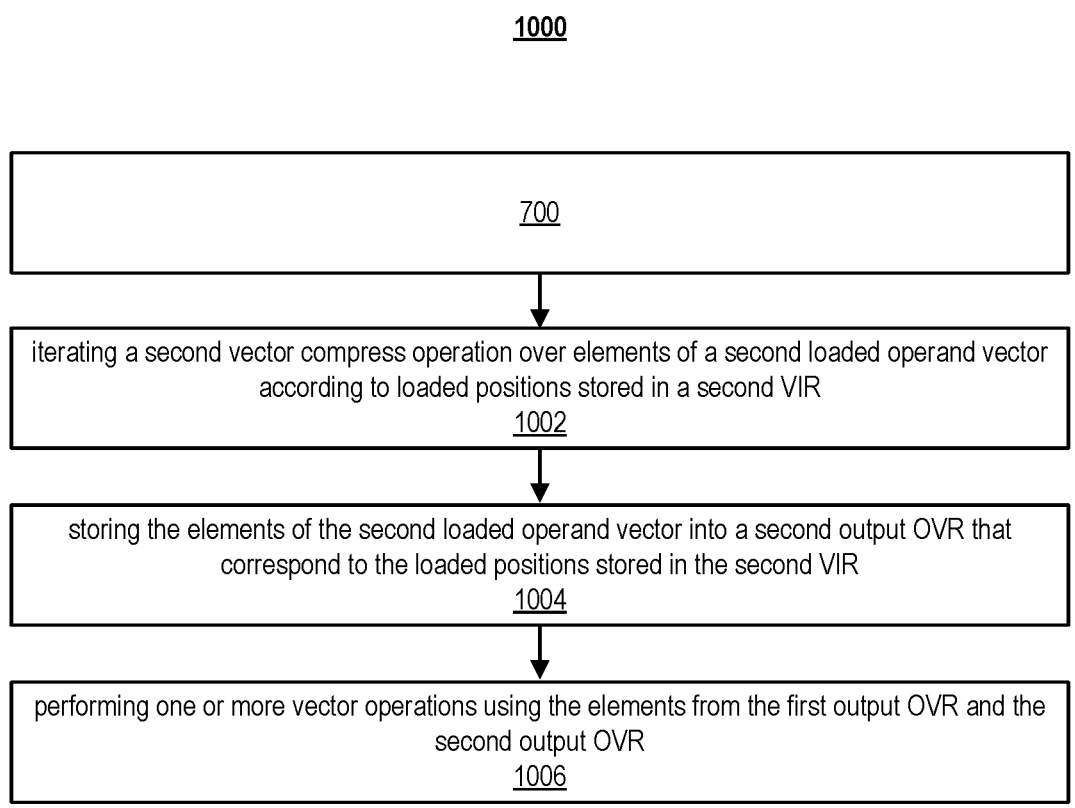
FIG. 10 illustrates example operations of method 1000 related to operations on multiple compressed vectors, in accordance with some embodiments of the present disclosure.

FIG. 10 illustrates example operations of method 1000 related to operations on multiple compressed vectors, in accordance with some embodiments of the present disclosure.

As shown in FIG. 10, the method 1000 can begin with method 700, which concludes with an output of a compressed operand vector stored in the output OVR. Also, analogous operations to method 700 are performed on a second operand vector. For example, at step 1002, the method 1000 continues with iterating a second compress operation over elements of a second loaded operand vector according to loaded positions stored in a second VIR.

At step 1004, the method 1000 continues with storing the elements of the second loaded operand vector into a second output OVR that correspond to the loaded positions stored in the second VIR.

At step 1006, the method 1000 continues with performing one or more vector operations using the elements from the first output OVR and the second output OVR. The one or more vector operations are using the elements from two compressed vectors, which are the elements from first output OVR and the second output OVR.

The methods 600, 700, 900, and 1000 include just some of the many operations that can be implemented by the vector processors and systems described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be partially provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A processor, comprising:
    an arithmetic logic unit;
    a vector load-store unit configured to generate effective addresses of load and store operations of the processor;
    an operand vector register configured to store at least a plurality of elements; and
    a vector index register configured to store a plurality of indices identifying respectively the plurality of elements stored in the operand vector register;
    wherein during a vector operation, the processor is configured to generate an output vector using an input vector and the arithmetic logic unit, the input vector having the plurality of elements identified by the plurality of indices stored in the vector index register; and
    wherein the vector load-store unit is further configured to, for each respective index stored in the vector index register, add the respective index to an effective address for accessing a corresponding position in the operand vector register.

2. The processor of claim 1, further comprising:
    a first output vector register;
    wherein the vector operation includes a compress operation to store, into the first output vector register and according to the plurality of indices stored in the vector index register, the plurality of elements in the operand vector register.

3. The processor of claim 2, wherein the processor is further configured to perform an expand operation configured to store elements from the first output vector register into a second output vector register.

4. The processor of claim 3, wherein the processor is configured to:
    load elements from the first output vector register; and
    iterate incremental positions of the expand operation over elements from the first output vector register according to positions identified by the vector index register.

5. The processor of claim 4, wherein the vector load-store unit is further configured to:
    load a count representative of an identification of an incremental position of the vector operation;
    load, from the vector index register from a position corresponding to the count, a second index representative of a second position;
    load a second element from the first output vector register from the position corresponding to the count; and
    store the second element into the second output vector register at the second position represented by the second index.

6. The processor of claim 3, wherein the expand operation is further configured to store a scalar into the second output vector register at positions of the second output vector register not identified by the vector index register.

7. The processor of claim 3, wherein the compress operation is a first compress operation, and a vector load-store unit is configured to:
    iterate a second compress operation over elements of a second loaded operand vector according to loaded positions stored in a second vector index register;
    store the elements of the second loaded operand vector into the second output vector register that correspond to the loaded positions stored in the second vector index register; and
    perform one or more vector operations using elements from the first output vector register and the second output vector register.

8. The processor of claim 2, wherein during the compress operation, the vector load-store unit is configured to:
    load, from the vector index register from a position corresponding to a count representative of an identification of an incremental position of the vector operation, a first index representative of a first position;
    load a first element from the operand vector register from the first position represented by the first index; and
    store the first element into the first output vector register at the position corresponding to the count.

9. The processor of claim 2, further comprising:
    a counter configured to output a count representative of an identification of an incremental position of the vector operation; and
    a multiplexer configured to receive, as a first input, the identification and, as a second input, an index selected according to the identification from the vector index register and configured to provide an output according to a mode value.

10. The processor of claim 9, wherein the multiplexer is configured to receive, as a selection input, the mode value, the mode value being a value for selection of the count or a value for selection of an output from the vector index register.

11. The processor of claim 2, comprising a plurality of vector index registers that includes the vector index register.

12. A method, comprising:
    storing, in an operand vector register in a vector processor, a list of elements;
    storing, in a vector index register in the vector processor, a plurality of indices identifying respectively a plurality of elements among the list of elements stored in the operand vector register; and
    during a vector operation:
        generating, with a vector load-store unit, effective addresses of load and store operations;
        for each respective index of the vector index register, adding the respective index to an effective address for accessing a corresponding position in the operand vector register; and
        generating an output vector using an input vector and an arithmetic logic unit, the input vector having the plurality of elements identified by the plurality of indices stored in the vector index register.

13. The method of claim 12, further comprising:
    performing, as part of the vector operation, a compress operation to store, into a first output vector register and according to the plurality of indices stored in the vector index, the plurality of elements in the operand vector register.

14. The method of claim 13, further comprising performing an expand operation configured to store elements from the first output vector register into a second output vector register.

15. The method of claim 14, wherein the expand operation is further configured to store a scalar into the second output vector register at positions of the second output vector register not identified by the vector index register.

16. The method of claim 13, wherein during the compress operation, the method further comprises:
    loading, by the vector load-store unit from the vector index register from a position corresponding to a count representative of an identification of an incremental position of the vector operation, a first index representative of a first position;

loading a first element from the operand vector register from the first position represented by the first index; and storing the first element into the first output vector register at the position corresponding to the count.

17. The method of claim 13, wherein a plurality of vector index registers includes the vector index register.

18. A system, comprising:

a processor;

an arithmetic logic unit;

an operand vector register configured to store a list of elements; and a vector index register configured to store a plurality of indices identifying respectively a plurality of elements from the list of elements stored in the operand vector register;

wherein during a first vector operation, the processor is configured to generate an output vector using an input vector and the arithmetic logic unit, the input vector having the plurality of elements identified by the vector index register;

wherein the processor is configured to perform, as part of the first vector operation, a compress or expand operation, wherein for each respective index stored in the vector index register, the compress operation or expand operation adds the respective index to an effective address for accessing a corresponding position in the operand vector register.

* * * * *